(12) United States Patent
Jost et al.

(10) Patent No.: US 12,425,374 B2
(45) Date of Patent: *Sep. 23, 2025

(54) MESSAGE TRANSMISSION BETWEEN CORE NETWORK DOMAINS

(71) Applicant: Telefonaktiebolaget LM Ericsson (publ), Stockholm (SE)

(72) Inventors: Christine Jost, Lund (SE); Juha Kujanen, Keuruu (FI); Helena Vahidi Mazinani, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 434 days.

This patent is subject to a terminal disclaimer.

(21) Appl. No.: 17/057,151

(22) PCT Filed: May 20, 2019

(86) PCT No.: PCT/EP2019/062986
§ 371 (c)(1),
(2) Date: Nov. 20, 2020

(87) PCT Pub. No.: WO2019/224157
PCT Pub. Date: Nov. 28, 2019

(65) Prior Publication Data
US 2021/0203643 A1 Jul. 1, 2021

Related U.S. Application Data

(60) Provisional application No. 62/674,179, filed on May 21, 2018.

(51) Int. Cl.
*H04L 29/06* (2006.01)
*H04L 9/40* (2022.01)
(Continued)

(52) U.S. Cl.
CPC .......... *H04L 63/0281* (2013.01); *H04L 63/20* (2013.01); *H04W 12/122* (2021.01); *H04W 88/182* (2013.01)

(58) Field of Classification Search
CPC ..... H04L 63/0281; H04L 63/20; H04W 80/10
See application file for complete search history.

(56) References Cited

U.S. PATENT DOCUMENTS 6,615,166 B1 9/2003 Guheen et al.
7,826,824 B2 11/2010 Fischer et al.
(Continued)

FOREIGN PATENT DOCUMENTS

CN 101005489 A 7/2007
CN 103493438 A 1/2014
(Continued)

OTHER PUBLICATIONS

Nokia, et al., "Addition of Maximum UE Availability Time", 3GPP TSG-SA WG2 Meeting #120, S2-172190, Busan, South Korea, Mar. 27-31, 2017, 1-6.
(Continued)

*Primary Examiner* — Wasika Nipa
(74) *Attorney, Agent, or Firm* — Murphy, Bilak & Homiller, PLLC

(57) ABSTRACT

Network equipment (300) is configured as a proxy (40, 50) for one of multiple different core network domains of a wireless communication system (10). The network equipment (300, 400) is configured to receive a message (60) that has been, or is to be, transmitted between the different core network domains. The network equipment (300, 400) is further configured to perform inter-domain security measures according to a security policy (80). The security policy (80) may indicate which one or more portions of (e.g., the content of a field in) the message (60) are to be used by
(Continued)

inter-domain security measures (e.g., inter-domain anti-spoofing measures) and/or which types of messages are to be used by the inter-domain security measures.

17 Claims, 11 Drawing Sheets

(51) Int. Cl.
*H04W 12/122* (2021.01)
*H04W 88/18* (2009.01)

(56) References Cited

U.S. PATENT DOCUMENTS

| | | | |
|---|---|---|---|
| 2006/0106802 | A1 | 5/2006 | Giblin et al. |
| 2007/0005801 | A1 | 1/2007 | Kumar et al. |
| 2008/0133729 | A1 | 6/2008 | Fridman et al. |
| 2012/0149342 | A1 | 6/2012 | Cohen et al. |
| 2012/0182929 | A1 | 7/2012 | Chen et al. |
| 2013/0203382 | A1 | 8/2013 | Takahashi et al. |
| 2015/0324215 | A1 | 11/2015 | Borthakur |
| 2016/0021064 | A1 | 1/2016 | Lock et al. |
| 2016/0119289 | A1* | 4/2016 | Jain .................... H04L 69/08 726/12 |
| 2016/0286385 | A1 | 9/2016 | Ryu et al. |
| 2017/0339240 | A1 | 11/2017 | Muller et al. |
| 2018/0026920 | A1 | 1/2018 | Chen et al. |
| 2018/0049156 | A1 | 2/2018 | Laha et al. |
| 2018/0103427 | A1 | 4/2018 | Griot et al. |
| 2018/0145842 | A1 | 5/2018 | Golin |
| 2019/0253395 | A1* | 8/2019 | Bykampadi .......... H04W 88/16 |

FOREIGN PATENT DOCUMENTS

| | | |
|---|---|---|
| CN | 105393583 A | 3/2016 |
| CN | 105684387 A | 6/2016 |
| CN | 106027455 A | 10/2016 |
| CN | 106663034 A | 5/2017 |
| CN | 107644313 A | 1/2018 |
| WO | 2019158681 A1 | 8/2019 |
| WO | 2019232780 A1 | 12/2019 |

OTHER PUBLICATIONS

China Mobile, "Living Document: Security of Service Based Architecture of 5G phase 1", 3GPP TSG SA WG3 (Security) Meeting #91, S3-181474, (S3-181236), Belgrade(RS), Apr. 16-Apr. 20, 2018, 1-23.
Deutsche Telekom AG, "N32 message anti-spoofing within the SEPP", 3GPP TSG SA WG3 (Security) Meeting #91, S3-181480, revision of S3-181244, Belgrade (Serbia), Apr. 16-20, 2018, 1-2.
Ericsson, "Format of message protection policies", 3GPP TSG SA WG3 (Security) Meeting #91Bis, S3-181818, La Jolla (US), May 21-25, 2018, 1-3.
Ericsson, "Policies for IE protection at SEPP", 3GPP TSG SA WG3 (Security) Meeting #90Bis, S3-180897, San Diego(US), Feb. 26-Mar. 2, 2018, 1-3.
Ericsson, "SBA: Example for SEPP Protection Policies, S3-181394, 3GPP", Mar. 22, 2018, 1-12.
Ericsson, "Structure for clause 13.2 on Application layer security on the N32 interface", 3GPP TSG-SA WG3 Meeting #91Bis, S3-181817, La Jolla (US), May 21-25, 2018, 1-8.
Huawei, et al., "Prevent fraudulent Registration Request attack", 3GPP TSG SA WG3 (Security) Meeting #91, S3-181481 (revision of S3-18297), Belgrade (Serbia), Apr. 16-20, 2018, 1-3.
"[Draft] LS on SBI Design and its Security Implications", 3GPP TSG-SA WG3 Meeting #90, Tdoc S3-180223, Gothenburg (Sweden), Jan. 22-26, 2018, 1-3.
"3GPP TS 23.060 V15.2.0", 3rd Generation Partnership Project; Technical Specification Group Services and System Aspects; General Packet Radio Service (GPRS); Service description; Stage 2 (Release 15), Mar. 2018, 1-367.
"3GPP TS 23.682 V15.4.0", 3rd Generation Partnership Project; Technical Specification Group Services and System Aspects; Architecture enhancements to facilitate communications with packet data networks and applications (Release 15), Mar. 2018, 1-124.
"3rd Generation Partnership Project; Technical Specification Group Services and System Aspects; Procedures for the 5G System; Stage 2 (Release 15)", 3GPP TS 23.502 V15.0.0, Dec. 2017, 1-258.
"3rd Generation Partnership Project; Technical Specification Group Services and System Aspects; System Architecture for the 5G System; Stage 2 (Release 15)", 3GPP TS 23.501 V15.0.0, Dec. 2017, 1-181.
Bryan, et al., "JavaScript Object Notation (JSON) Pointer", Internet Engineering Task Force (IETF), Request for Comments: 6901, Apr. 2013, 1-8.
"Presentation sheet for 3GPP TS 29.251 v1.0.0 on Nu reference point between SCEF and PFDF for sponsored data connectivity for Information", TSG CT Meeting #75, CP-170101, Dubrovnik, Croatia, Mar. 6-7, 2017, 1 page.
Ericsson, "Comment contribution to S3-180223 (LS to CT3 CT4 on SBI Design and its Security Implications)", 3GPP TSG SA WG3 (Security) Meeting #90, S3-180341, Gothenburg (Sweden), Jan. 22-26, 2018, 1-5.
Ericsson, "Discussion on NF access in roaming", 3GPP TSG CT4 Meeting #82, C4-181040, Gothenburg, SWEDEN, Jan. 22-26, 2018, 1-4.
Nokia, "Considerations on applying security on HTTP message payload", 3GPP TSG SA WG3 (Security) Meeting #90, S3-180260, (revision of S3-17xabc), Gothenburg (Sweden), 22 Jan.-Jan. 26, 2018, 1-5.
Tim, "Analysis of different approaches for implementing SBA security over N32 reference point", 3GPP TSG SA WG3 (Security) Meeting #90, S3-180028, Gothenburg (Sweden), Jan. 22-Jan. 26, 2018, 1-5.
Unknown, "3GPP TS 23.401 V15.3.0 (Mar. 2018)", 3rd Generation Partnership Project; Technical Specification Group Services and System Aspects; General Packet Radio Service (GPRS) enhancements for Evolved Universal Terrestrial Radio Access Network (E-UTRAN) access (Release 15), Mar. 2018, 1-402.

* cited by examiner

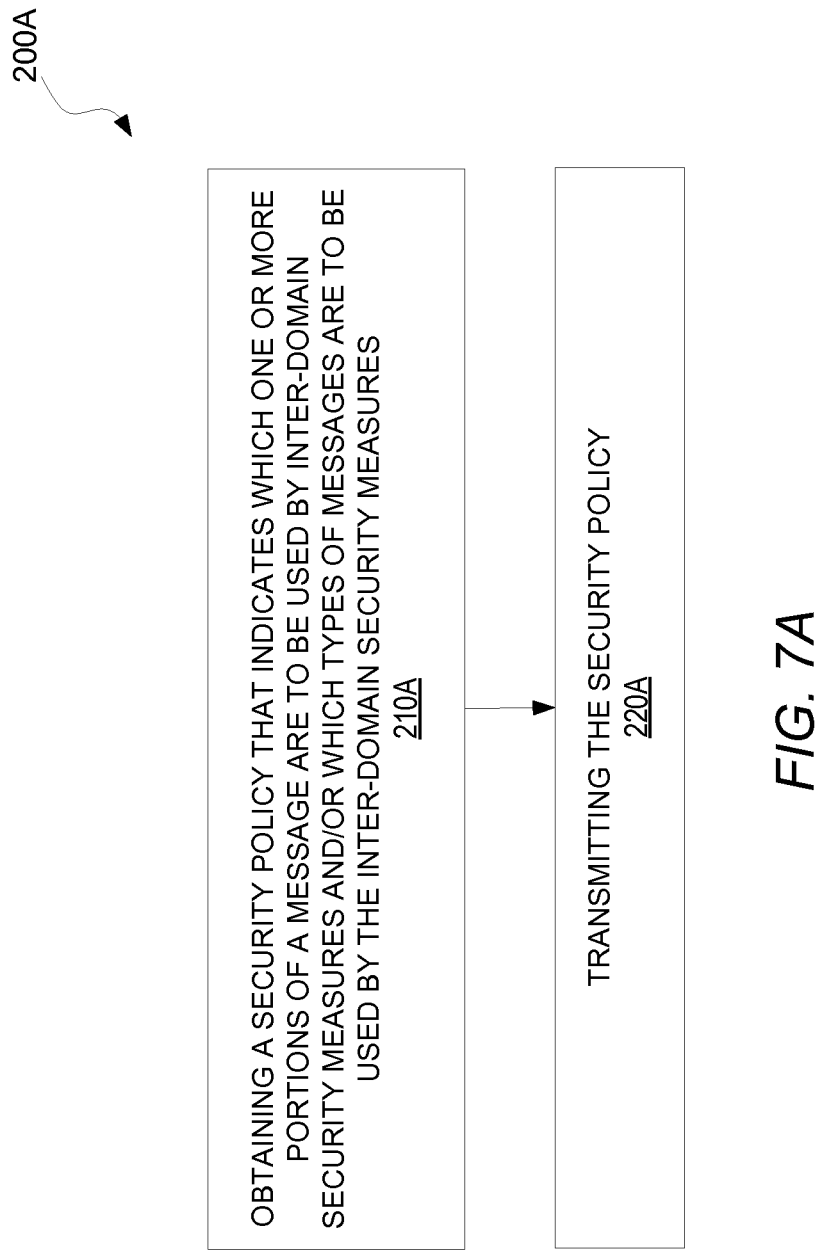

MESSAGE TRANSMISSION BETWEEN CORE NETWORK DOMAINS

TECHNICAL FIELD

The present application relates generally to a wireless communication system, and more particularly relates to message transmission between different core network domains of a wireless communication system.

BACKGROUND

A user's serving network domain includes the core network equipment and functions that are local to the user's access point. The user's home network domain includes the core network equipment and functions that are independent of the location of the user's access point. The user's home network domain may for instance manage the user's subscription information and/or home-specific services. When the user's serving network domain is different than the user's home network domain, the serving network domain and home network domain communicate with one another, e.g., for user authentication, for user-specific data/services, etc. In these and other instances, communication between different core network domains should be secure.

Some contexts complicate the security of inter-domain communication. First, an internetwork exchange provider that supports interconnection between different core network domains may actually need to read and/or modify some of the communication in order to offer certain valuable services to network operators. Second, ensuring proper security of inter-domain communication in the face of evolving communication formats threatens to impose impractical administrative and operational overhead.

SUMMARY

Some embodiments herein exploit a security policy for inter-domain security of a message transmitted between different core network domains of a wireless communication system. The security policy may indicate which one or more portions of the message are to be used by inter-domain security measures and/or which types of messages are to be used by inter-domain security measures. In fact, in some embodiments, the security policy indicates which one or more portions of the content of a field in the message are to be used by inter-domain security measures. In this case, the security policy effectively provides (out-of-band) updates on the portion(s) to be used by inter-domain security measures, even as the formatting of the message's field evolves.

Alternatively or additionally, in some embodiments, a security policy for inter-domain security measures may be dynamically received and/or updated. For example, in one embodiment, the security policy applicable for a certain message (e.g., of a specific type) may be dynamically discovered and/or retrieved responsive to receiving the message. In another embodiment, the security policy applicable for the certain message may be included in or otherwise associated with the message itself.

Some embodiments may advantageously provide flexible inter-domain security that evolves along with message formatting changes (e.g., attributable to the evolution of network functions in the core network), while minimizing or at least reducing administrative and/or operational overhead that would otherwise be required for such flexibility.

More particularly, embodiments herein include a method performed by network equipment configured as a proxy between different core network domains of a wireless communication system. The method may comprise receiving a message that has been, or is to be, transmitted between the different core network domains. The method may also include performing inter-domain security measures according to a security policy, e.g., that the network equipment receives from a discovery service or from other network equipment. In some embodiments, the security policy indicates which one or more portions of the message are to be used by inter-domain security measures. For example, in one embodiment, the security policy indicates which one or more portions of the content of a field in the message are to be used by inter-domain security measures.

In some embodiments, the security policy indicates which one or more portions of the message are to be used by the inter-domain security measures.

In some embodiments, the security policy indicates which one or more portions of the content of a field in the message are to be used by the inter-domain security measures.

In some embodiments, the security policy indicates which portion of the message is a public land mobile network identity or a fully qualified domain name to be used by the inter-domain security measures. Alternatively or additionally, the security policy may indicate which portion of the message is a subscriber permanent identifier, SUPI, to be used by the inter-domain security measures.

In some embodiments, the inter-domain security measures include inter-domain anti-spoofing measures for securing the core network domain for which the proxy is configured against spoofing of the message.

In some embodiments, the network equipment is configured as a first proxy for a first core network domain. In one or more of these embodiments, the method may comprise receiving the message from a second proxy that is a proxy for a second core network domain, and performing the inter-domain security measures using the one or more indicated portions may comprise verifying whether a core network domain identified from the one or more indicated portions is the second core network domain for which the second proxy is a proxy.

In some embodiments, the message has been transmitted between the different core network domains. In one or more of these embodiments, performing the inter-domain security measures using the one or more indicated portions may comprise: determining an expected identifier that is expected for the one or more indicated portions; and verifying whether an identifier associated with a proxy from which the message was received matches the expected identifier.

In some embodiments, the method may comprise receiving the security policy from a discovery service or receiving the security policy from network equipment in a path that the message takes from a source of the message to a destination of the message.

In some embodiments, the one or more portions that are to be used by the inter-domain security measures according to the security policy include one or more of: a public land mobile network identity, a fully qualified domain name, or a subscriber permanent identifier, SUPI.

In some embodiments, the security policy includes: one or more regular expressions that indicate the one or more portions; one or more JavaScript Object Notation, JSON, Pointers, that indicate the one or more portions; one or more search patterns that indicate the one or more portions; one or more tokens that indicate the one or more portions; and/or one or more substrings that indicate the one or more portions.

In some embodiments, the security policy indicates which one or more portions of the content of a field in the message are to be used by the inter-domain security measures. In one or more of these embodiments, the method further comprises extracting the one or more portions of the content of the field for using in the inter-domain security measures, by parsing the content using the security policy.

In some embodiments, the security policy indicates which one or more portions of the content of a field in the message are to be used by the inter-domain security measures, the message is a Hypertext Transfer Protocol (HTTP) message and the field is an HTTP field.

In some embodiments, the message is an application layer message.

In some embodiments, the network equipment is configured as a Security Edge Protection Proxy, SEPP.

In some embodiments, the core network domains comprise core networks of different public land mobile networks, PLMNs.

Embodiments herein also include a method performed by network equipment for facilitating protection of a message transmitted between different core network domains of a wireless communication system. The method may comprising obtaining a security policy. In some embodiments, the security policy indicates which one or more portions of the message are to be used by inter-domain security measures and/or which types of messages are to be used by the inter-domain security measures. For example, in one embodiment, the security policy indicates which one or more portions of the content of a field in the message are to be used by inter-domain security measures. Regardless, the method may also comprise transmitting the security policy. For instance, in some embodiments, the method comprises transmitting the security policy to network equipment configured, as a proxy between the different core network domains, to perform the inter-domain security measures according to the security policy.

Embodiments herein also include corresponding apparatus, computer programs, and carriers (e.g., non-transitory computer readable mediums). For example, embodiments include network equipment configured as a proxy between different core network domains of a wireless communication system. The network equipment may be configured (e.g., via communication circuitry and processing circuitry) to receive a message that has been, or is to be, transmitted between the different core network domains. The network equipment may also be configured to perform inter-domain security measures according to a security policy, e.g., that the network equipment receives from a discovery service or from other network equipment. In some embodiments, the security policy indicates which one or more portions of the message are to be used by inter-domain security measures. For example, in one embodiment, the security policy indicates which one or more portions of the content of a field in the message are to be used by inter-domain security measures.

BRIEF DESCRIPTION OF THE DRAWINGS

FIG. 7A is a logic flow diagram of a method performed by network equipment according to some embodiments.

DETAILED DESCRIPTION

Figure 1:
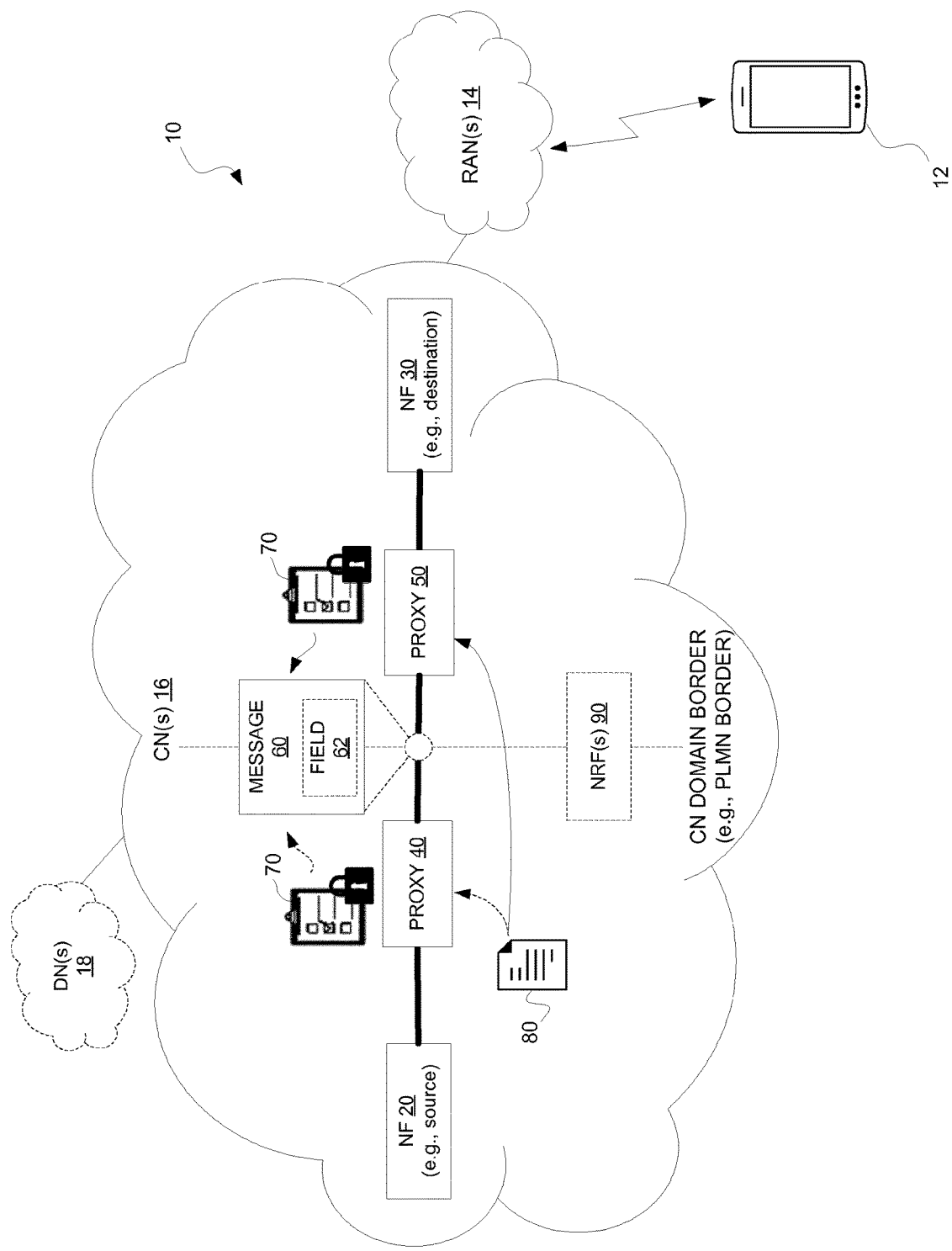
FIG. 1 is a block diagram of a wireless communication system according to some embodiments.

FIG. 1 shows a wireless communication system 10 according to some embodiments. The system 10 includes one or more radio access networks (RANs) 14 that wirelessly connect wireless devices 12 to one or more core networks (CNs) 16, e.g., of one or more public land mobile networks (PLMNs). The CN(s) 16 in turn connect the wireless devices 12 to one or more data networks 18, e.g., the Internet, a public switched telephone network (PSTN), etc.

The CN(s) 16 in some embodiments have a service-based architecture that leverages service-based interactions between CN network functions (NFs), two of which are shown as NFs 20, 30. Each NF 20, 30 may be implemented by network equipment either as a network element on dedicated hardware, as a software instance running on dedicated hardware, or as a virtualized function instantiated on an appropriate platform, e.g., on a cloud infrastructure. Where the system 10 is a 5G system, for instance, NFs in the control plane may include an access and mobility management function (AMF), a session management function (SMF), a policy control function (PCF), an authentication server function (AUSF), a unified data management (UDM) function, etc.

An NF may provide its services to other authorized NFs that consume those services. An NF may thereby take on a provider role as a provider of a service (NF service provider) and/or a consumer role as a consumer of a service (NF service consumer). In one example, NF 20 operates as NF service consumer to consume services provided by NF 30 as NF service provider. Regardless, as part of, or in order for, an NF service provider to provide its services to an NF service consumer, the NFs 20, 30 exchange communication in the form of messages. In some embodiments, though, the NFs 20, 30 are in different PLMNs. In these and other embodiments, then, these messages must be transmitted between different core network domains.

FIG. 1 shows that proxies 40, 50 facilitate inter-domain messaging. Each proxy 40, 50 is configured as a proxy for a respective core network domain. Where the NFs 20, 30 are in different PLMNs, for instance, the proxies 40, 50 may be edge proxies (e.g., in the form of security edge protection proxies, SEPPs) at the edge of a respective PLMN. Each proxy 40, 50 intercepts messages (e.g., at an application layer) that are incoming to and/or outgoing from that domain, e.g., to inspect and/or filter the messages (e.g., for maliciousness, fraud, spoofing, etc.), to perform load balancing, or the like. The proxies 40, 50 in some embodiments hide the topology of their respective core network domain. The proxies 40, 50 also secure inter-domain messaging between the core network domains.

More particularly in this regard, FIG. 1 shows as an example that NF 20 is the source of a message 60 (e.g., an application layer message) to be transmitted to NF 30 as the destination of the message 60. With NFs 20, 30 in different core network domains, NF 20 transmits the message to NF 30 via proxies 40 and 50. Proxy 40 and/or proxy 50 perform inter-domain security measures 70 to secure communication of the message 60 between the core network domains (e.g., against fraud or spoofing). The inter-domain security measures 70 in these and other embodiments may for instance include inter-domain anti-spoofing measures for securing the destination core network domain (i.e., the core network domain for which proxy 50 serves as a proxy) against spoofing of the message 60. For example, the proxy 50 may perform the security measures 70 to verify whether a core network domain identified from the message 60 (e.g., via a PLMN ID or fully qualified domain name, FQDN, included in the message 60) is in fact the core network domain from which the message 60 was received, e.g., so as to ensure that the message 60 was not spoofed in terms of the core network domain the message 60 identifies.

No matter the particular nature of the security measures 70, proxy 40 and/or proxy 50 according to some embodiments perform the inter-domain security measures 70 according to a security policy 80. The security policy 80 may indicate which one or more portions of the message 60 are to be used by the inter-domain security measures 70 (e.g., which portion(s) identify a core network domain) and/or which types of messages are to be used by the inter-domain security measures 70. In some embodiments, the security policy 80 for the inter-domain security procedure 70 may be dynamically received and/or updated by the proxy 40 and/or 50. Proxy 40 and/or 50 may for instance dynamically discover the security policy 80 from one or more network repository functions (NRFs) 90 and/or receive the security policy 80 within or in association with the message 60 itself. Regardless, the security policy 80 especially as dynamically retrieved or updated may account for changes or evolution to which portion(s) of the content of the message 60 are used by the inter-domain security measures 70 and/or to the types of messages for which the inter-domain security measures 70 is performed. This way, configuration of the proxy 40 or 50 itself does not need be (manually) updated to account for such change or evolution. These and other embodiments, then, advantageously provide flexible security that evolves along with message formatting and/or security measure changes (e.g., attributable to the evolution of network functions or service in the core network), while minimizing or at least reducing administrative and/or operational overhead that would otherwise be required for such flexibility.

More particularly, in some embodiments where the security policy 80 indicates which one or more portions of the message 60 are to be used by the inter-domain security measures 70, the security policy 80 indicates which one or more portions of the content of a field 62 in the message 60 are to be used by the inter-domain security measures 70.

Field 62 in this regard may be predefined (e.g., based on the protocol according to which the message 60 is generated) as having content of a certain type and/or purpose. Field 62 in some embodiments may also be referred to as an element or information element. In this way, the inter-domain security measures 70 may selectively use certain portion(s) of a given field's content, rather than the field's content as a whole. The proxy 40 and/or 50 in some embodiments therefore may be (somewhat statically) configured to understand the field 62, but are more dynamically informed via the security policy 80 as to which portion(s) of the field 62 are to be used by the security measures 70 (e.g., as the formatting of the field 62 and/or the security measures 70 evolve).

Figure 2A:
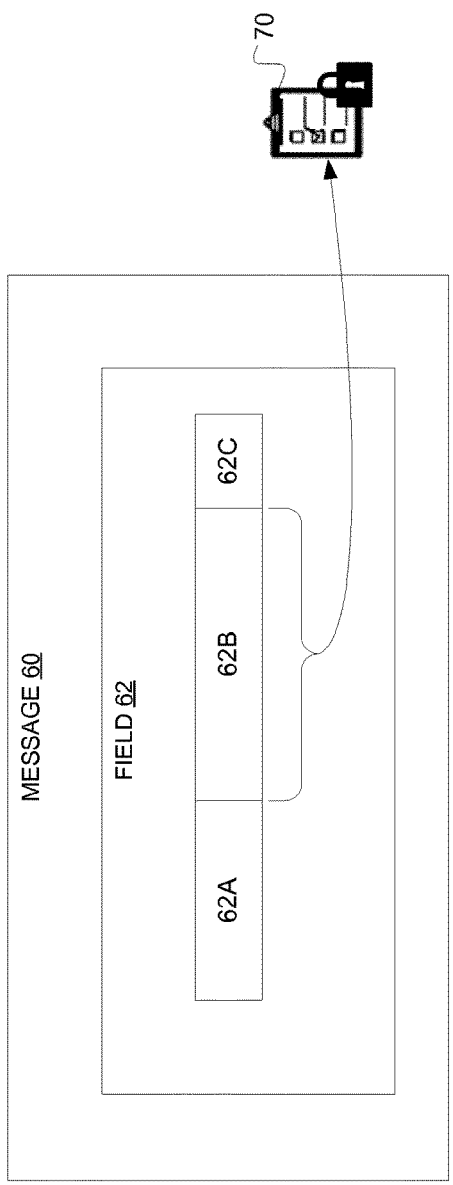
FIG. 2A is a block diagram of a field in a message used by inter-domain security measures according to some embodiments.

FIG. 2A shows an example. As shown in FIG. 2A, the content of the field 62 has multiple portions 62A, 62B, and 62C. These portions may all have the same type and/or purpose so as to together form the field's content. But the inter-domain security measures 70 may selectively use portion 62B, to the exclusion of portions 62A and 62C. In some embodiments, for example, proxy 50 extracts portion 62B from the field 62 and selectively uses the extracted portion in the inter-domain security measures 70. Portions 62A and 62C may remain unused.

Figure 2B:
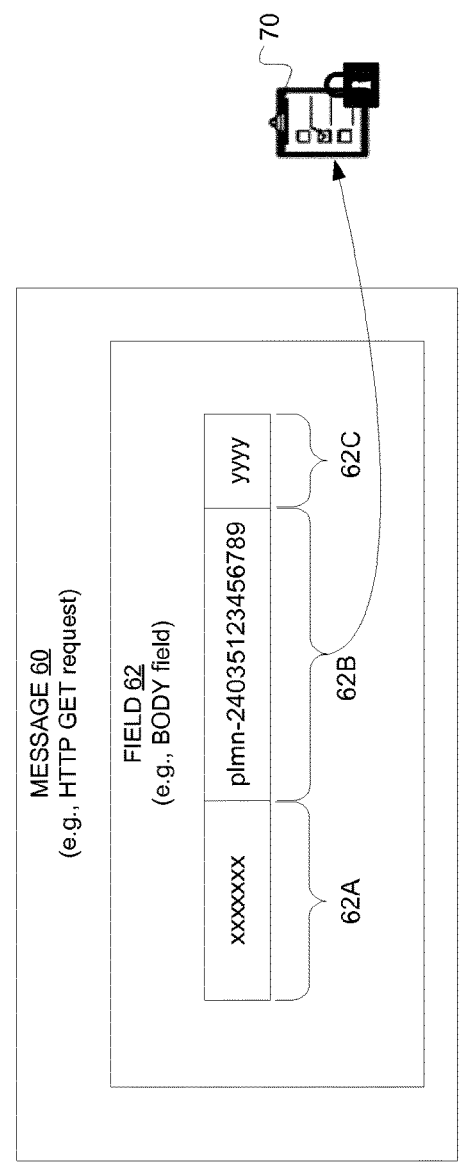
FIG. 2B is a block diagram of example content of a field in a message used by inter-domain security measures according to some embodiments.

FIG. 2B illustrates a specific example of the field's content in some embodiments where the message 60 is a HyperText Transfer Protocol (HTTP) message and the field 62 is an HTTP field (e.g., a body or a part of the body of the HTTP message, or a field in an HTTP header or pseudo header). As shown, the message 60 is an HTTP GET request and the field 62 is a BODY field. The content of the BODY field may include JSON content. In this case, then, the inter-domain security measures 70 may use one or more portions of the JSON content in the BODY field. Indeed, the content of the BODY field in this example contains multiple portions 62A, 62B, and 62C, with the inter-domain security measures 70 selectively using only portion 62B of the request URI. Portion 62B in this example includes a public land mobile network (PLMN) identifier. Other portions 62A and 62C may remain unused. Of course, although this example involves an HTTP GET request, a BODY field, and a PLMN identifier, the embodiments herein extend to any type of message 60, field 62, and portion of the field 62. In other embodiments, for instance, the field 62 may be a HEADER field (e.g., a PATH field). In this and other embodiments, then, the PLMN identifier may be included in a header of the message 60.

In some embodiments, the security policy 80 includes one or more regular expressions that indicate the one or more portions of the message 60 to be used by the inter-domain security measures. A regular expression in this regard may be a sequence of characters that defines a search pattern. The search pattern may in turn be used by searching algorithms to find a certain pattern of characters in the message 60 (e.g., in the field's content).

For instance, a regular expression usable to find portion 62B in FIG. 2B (e.g., the PLMN ID) may be "^xxxxxxx([^/?#]+)yyyy$". In this example, the circumflex character (namely, ^) and the dollar sign character (namely, $) are anchors that do not "consume" any characters, but instead tie the pattern to the beginning and end of the string being searched. The characters ([^/?#]+) in the regular expression capture any subpattern or subgroup that includes one or more occurrences of any character except the forward slash character (/), the question mark character (?), and the pound character (#). This captured subpattern or subgroup is output from the searching algorithm. Accordingly, parsing the field's content using the regular expression provides the subpattern "plmn-24035123456789". The inter-domain security measures 70 may therefore selectively use only this subpattern, to the exclusion of other portions 62A and 62C of the field's content.

Of course, a regular expression is just one way to indicate a portion as used herein. The security policy 80 may include any type of expression, pattern, syntax, language, delimiter, pointer, rule, or other information that indicates the one or more portions. For example, in some embodiments, the information may be any information that indicates a pattern, token, or substring inside a broader string. For instance, the information may alternatively indicate portion 62B as a certain number path segment in the field's content; that is, the subpattern or subgroup of characters occurring between certain tokens or delimiters, e.g., in the form of a forward slash (/). In still other embodiments, the information may include one or more ranges of bytes within the field 62, and/or one or more ranges of bits within the field 62, that indicate the one or more portions.

In yet other embodiments, the security policy 80 includes one or more JavaScript Object Notation, JSON, Pointers, that indicate the one or more portions of the message 60 to be used by the inter-domain security measures 70. A JSON Pointer (e.g., as defined in RFC 6901) is a string syntax for identifying a specific value within a JSON document. A JSON Pointer may be expressed in JSON string values and/or URI fragment identifiers. A JSON Pointer in particular is a Unicode string containing a sequence of zero or more reference tokens. Each token is prefixed by a forward slash '/' character. In these and other embodiments, then, the security policy 80 as an example may indicate one or more portions of content in the body or payload of an HTML message, where that body or payload includes a JSON document.

No matter the particular nature of the information in the security policy 80, these examples illustrate that the security policy 80 in some embodiments indicates the portion(s) (to be used by the inter-domain security measures 70) with information that is agnostic to, independent of, and/or generically applicable to any of the underlying message/field content or the message's transmission protocol. The security policy 80 may for instance be capable of indicating any portion(s) of content in a field 62 with the same general kind of information (e.g., a regular expression), no matter the type, structure, or formatting of the field's content. That is, in one instance the information may be formed (e.g., as a particular regular expression) to indicate a certain portion of content in the field 62 based on the content having a certain type or format (e.g., a PLMN ID), but in another instance the information may be formed (e.g., as a different regular expression) to indicate a different portion of content in the field 62 based on the content having a different type or format (e.g., a FQDN). But the information in both instances has the same general character (e.g., both are regular expressions), so as to universally enable the proxies 40, 50 to identify any portion(s) without regard to whether or how the type, structure, or format of the underlying content evolves. Accordingly, configuring proxies 40, 50 to generically understand or process regular expressions or other information in the security policy 80 sufficiently equips the proxies 40, 50 to selectively use any portion of content in the message 60 or the field 62 in the security measures 70, even without the proxies 40, 50 being configured to more specifically understand that content. In the example of FIG. 2B, then, a proxy needs to simply understand how to process a regular expression to use portion 62B in the security measures 70, without having to more specifically understand how to identify a PLMN ID or FQDN. This means the proxies 40, 50 can remain ignorant of how that underlying content changes or evolves (e.g., in terms of its form or structure), such as in response to the introduction of new entities (e.g., network functions) and/or services (e.g., represented by their HTTP URIs) to the system 10. In some embodiments, then, it is the information in the security policy 80 (e.g., the regular expressions) that dynamically changes or evolves to account for changes or evolution to the underlying content of the message 60 (e.g., in terms of its structure or format), rather than the proxies' general configuration to identify portion(s) using that kind of information.

Alternatively or additionally to the embodiments above, a security policy 80 for inter-domain security of a message 60 may be dynamically received and/or updated by the proxy 40 or 50. The dynamic retrieval and/or update of the policy 80 may account for changes or evolution to the content of the message 60. This way, configuration of the proxy 40 or 50 itself does not need be (manually) updated to account for such change or evolution.

Figure 3:
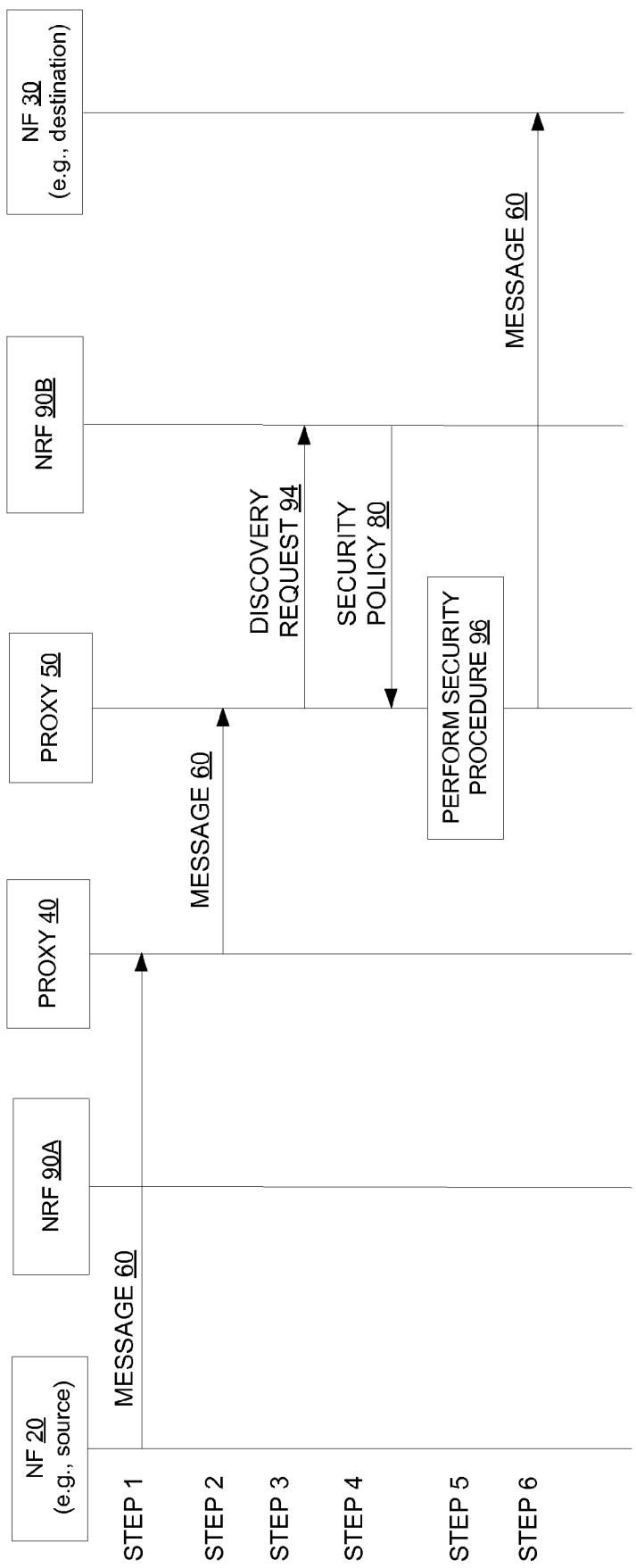
FIG. 3 is a call flow diagram of a process for one or more proxies to obtain a security policy according to some embodiments.

FIG. 3 for example illustrates some embodiments where the proxy 50 performs the inter-domain security measures 70 based on dynamically discovering the security policy 80 from one or more network repository functions (NRFs) 90, e.g., responsive to receiving the message 60. As shown, NF 20 as the source of the message 60 transmits the message 60, which is intercepted by or otherwise received by proxy 40 (Step 1). In response to receiving the message 60, proxy 40 transmits the message 60 across the core network domain border by transmitting the message 60 to proxy 50, e.g., after performing any of its own processing of the message 60 (Step 2). In response to receiving the message 60, proxy 50 transmits a discovery request 94 to a discovery service (in its core network domain), shown as being implemented by NRF 90B (Step 3). The discovery service is shown here as being implemented by NRF 90B but in other embodiments may be implemented by a standalone function co-located with the NRF or by other network equipment or functions. Regardless, in response to the discovery request, proxy 50 receives the security policy 80 from the discovery service (Step 4). The proxy 50 performs the inter-domain security measures 70 according to the protection policy 80 (Block 96). In some embodiments, the proxy 50 then transmits the message 60 towards NF 30 as the message's destination (Step 6). Such transmission may nonetheless be dependent on the outcome of the security measures 70. For example, if the security measures 70 includes anti-spoofing measures, the proxy 50 may selectively transmit the message towards its destination only if the message 60 was not spoofed, i.e., it may discard the message 60 if the message 60 was spoofed. In some embodiments, proxy 40 may discover the security policy 80 from an NRF 90A in its own core network domain and perform the inter-domain security measures 70 similarly for messages incoming to that core network domain.

Although not shown, in some embodiments, the source and/or destination of the message provides the security policy 80 applicable for the message 60 to the discovery service in one or more of the core network domains, e.g., for later discovery of that policy 80 as shown in FIG. 3. For example, where NF 30 is a provider NF that provides a service to NF 20 as a consumer NF, and the message 60 is a message that NF 20 sends to NF 30 for consuming that service, NF 30 as the provider NF in some embodiments provides its service profile to the NRF 90B (e.g., as part of initial registration or registration update), including the security policy 80 applicable for one or more messages used for consuming a service provided by NF 30. The NRF 90B may in turn distribute or otherwise provide the service profile or at least the protection policy 80 to NRF 90A, for later discovery by potential consumer NFs.

In yet other embodiments, though, the proxy 40 and/or 50 may subscribe to proactively receive new or updated protection policies from the NRF 90A and/or 90B. In these and other embodiments, proxy 40 and/or 50 may store (e.g., cache) received protection policies in anticipation of later use for security of messages transmitted between the core network domains.

Figure 4:
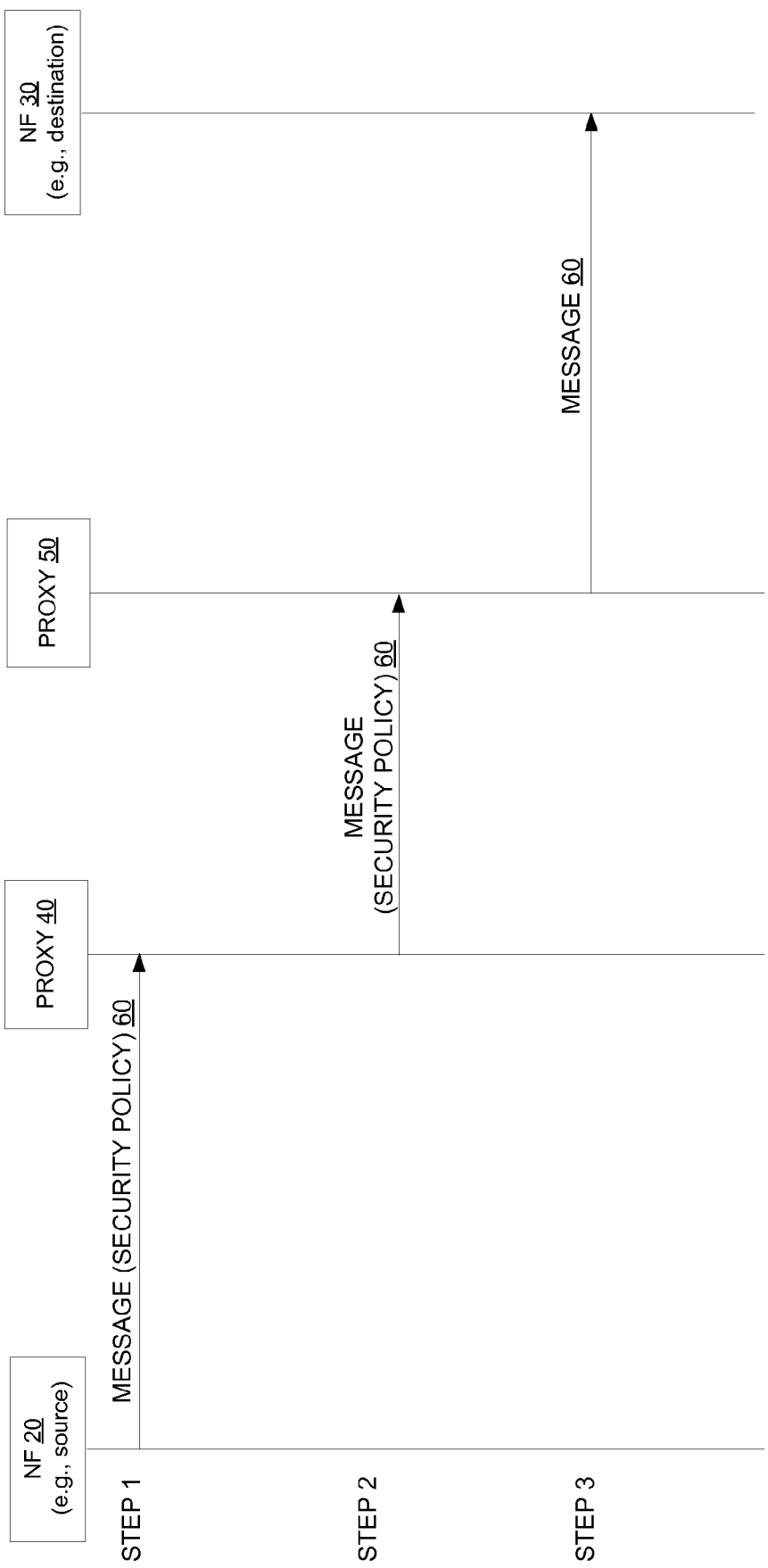
FIG. 4 is a call flow diagram of a process for one or more proxies to obtain a security policy according to other embodiments.

FIG. 4 by contrast shows other embodiments where proxy 40 and/or 50 receives the security policy 80 from network functions or equipment in a path that the message 60 takes from the source to the destination of the message 60. In particular, FIG. 4 shows that NF 20 as the message source transmits the message 60 with the security policy 80 embedded or otherwise included in the message 60 itself (e.g., in a header of the message) (Step 1). In this way, proxy 40 receives the security policy 80 from the source of the message 60. Proxy 40 then transmits the message 60 across the core network domain border, again with the security policy 80 included in the message 80 (Step 2). Proxy 50 accordingly receives the security policy 80 from proxy 40 in a different core network domain. Proxy 50 may then remove the security policy 80 from the message 60 and forward it on towards NF 30 as the destination (Step 3).

Note that the portion(s) identified by the security policy 80 may include any type of information usable for inter-domain security measures 70. In some embodiments, for example, the security policy 80 indicates which one or more portions of (e.g., the content of a field 62A in) the message 60 includes a PLMN identity, a mobile network code (MNC), a mobile country code (MCC), and/or a fully qualified domain name (FQDN) that are to be used by the inter-domain security measures 70. Where the message 60 is an HTTP message, for instance, the security policy 80 may indicate which portion(s) of the JSON content within the HTTP body include a PLMN identity, an MNC, an MCC, and/or a FQDN, e.g., to be checked for spoofing by the inter-domain security measures 70. Indeed, especially where the security measures 70 are anti-spoofing measures, the security measures may verify whether a PLMN identity, MNC+MCC combination, or a FQDN included in the identified portion(s) of the message 60 actually identifies or is associated with the core network domain from which the message 60 was received. This may involve for instance proxy 50 verifying whether the FQDN of the proxy 40 from which the message 60 was received matches the one expected for the PLMN identity, MNC+MCC combination, or FQDN included in the identified portion(s) of the message 60. Any other sort of identifier may be used, though, in which case the security measures 70 may involve determining an expected identifier that is expected for the one or more indicated portions and verifying whether an identifier associated with a proxy 40 from which the message 60 was received matches the expected identifier. Alternatively or additionally, the inter-domain security measures 70 may include verifying that the combination of MCC and MNC is valid (e.g., is actually assigned to a core network domain operator).

As another example, the security policy 80 may indicate which one or more portions of (e.g., the content of a field 62A in) the message 60 includes a subscriber permanent identifier, SUPI, (e.g., an international mobile subscriber identifier, IMSI, or network access identifier, NAI) to be used by the inter-domain security measures 70. Where the message 60 is an HTTP message, for instance, the security policy 80 may indicate which portion(s) of the JSON content within the HTTP body include a SUPI, e.g., to be checked for spoofing by the inter-domain security measures 70. Indeed, especially where the security measures 70 are anti-spoofing measures, the security measures may verify whether the SUPI is within a range of SUPIs allocated to one or more certain core network domains, e.g., the core network domain from which the message 60 was received or the receiving core network domain. For instance, if the SUPI is contained in an incoming message received by proxy 50, the proxy 50 may verify that the SUPI is either within the SUPI range of the proxy's core network domain operator or the pre-configured SUPI range of an associated roaming partner.

These examples demonstrate that, in some embodiments, the security measures 70 may be used to protect a core network domain from malicious messages that contain spoofed content (e.g., JSON content within the HTTP body) in order to obtain unauthorized service access or obtain information about the topology of the core network domain.

Figure 5:
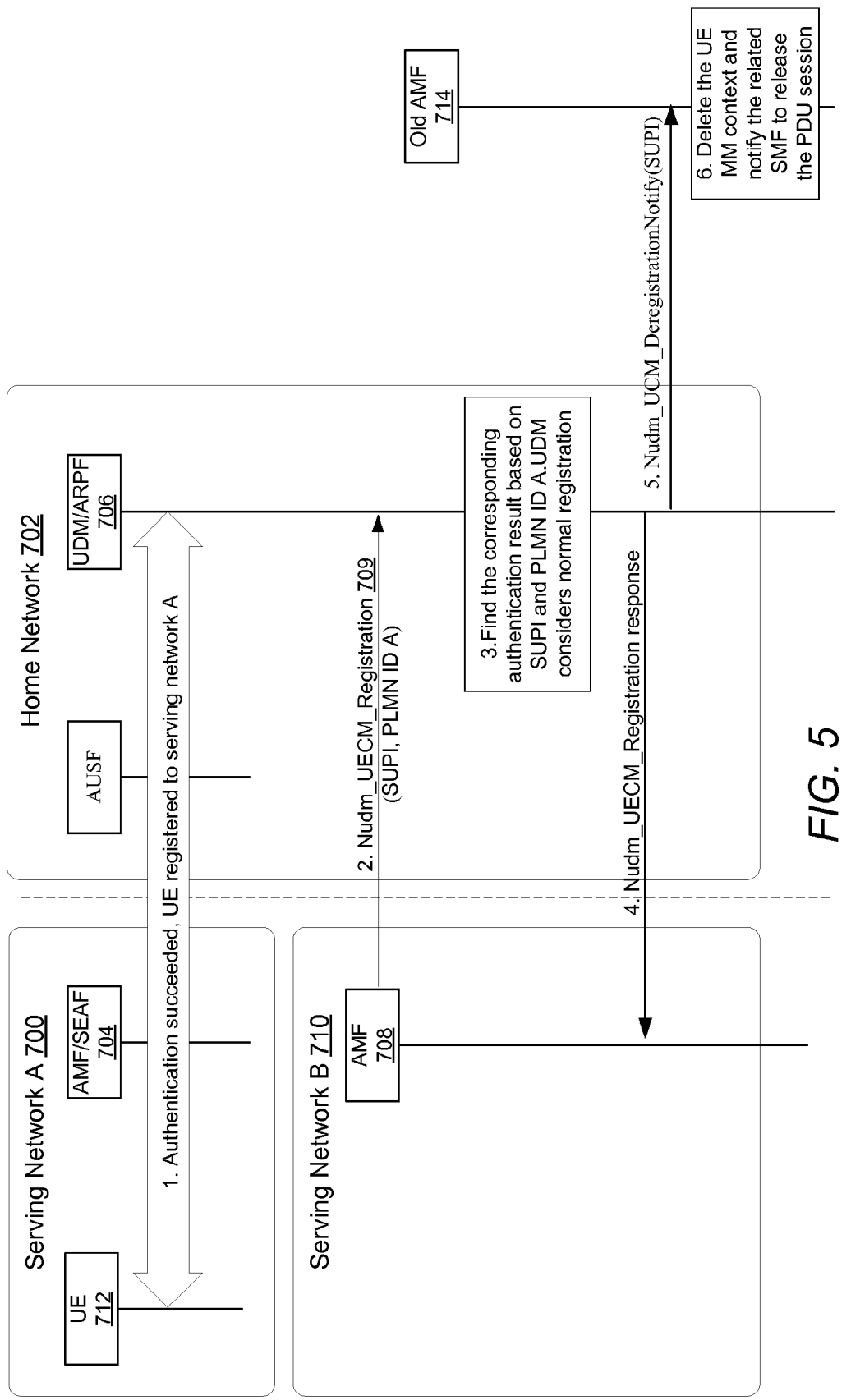
FIG. 5 is a block diagram of a wireless communication system according to some embodiments for guarding against fraudulent registration.

FIG. 5 illustrates still further application of some embodiments where the message 60 is a registration message, e.g., for registering a serving network function with a home network function. In this case, the security measures 70 may guard against a fraudulent registration message attack.

A fraudulent Registration Request attack in a 5G system is a serious and common attack that may occur in roaming scenarios, e.g. fraudulent Nudm_UECM_Registration Request for registering the subscriber's serving access and mobility function (AMF) in unified data management (UDM) function that are not actually present in the visited network. A fraudulent visited network that has a valid roaming relationship with the home operator may request authentication vectors from the home network and subsequently send an Update Location request for subscribers that are not actually present in the visited network. They may hope to be able to obtain additional revenue by claiming charges for the allegedly visiting subscriber.

As shown in FIG. 5, serving network A 700 is a roaming partner of the home network 702, so the AMF 704 in the serving network A 700 may normally interact with UDM 706 in the home network 702 at any time. The home network 702 and the serving network A 700 are connected over an N32 interface, e.g., between SEPPs for inter-PLMN communication. At any time after the UE 712 registered to the serving network A 700 successfully in Step 1, a malicious AMF 708 in serving network B 710 may, in Step 2, fake a registration request message 709 including faked PLMN ID A to the UDM 706. The UDM 706 in Step 3 verifies the authentication result based on SUPI and PLMN IDA. The UDM 706 in Step 5 informs the old AMF 714 to deregister the subscriber corresponding to SUPI. The old AMF in Step 6 deletes the mobility management (MM) context and notifies the related SMF to release the PDU sessions.

A practical scenario of the above attack is that an internal employee of a regular operator B may configure the AMF. The employee may intentionally change the PLMN ID B to the PLMN ID A of other operators' networks, which may deregister a large number of UEs registered in the network A.

Alternatively, both operator A and operator B are roaming partners of the home network, and they are in a competitive relationship in the same roaming area. The operator B may ruin the reputation of the operator A through the above attacks for malicious competition.

The reason why the above attack may be realized is that the NF of the home network cannot know whether the PLMN ID in the registration request message matches the serving network of AMF. Moreover, there are many other services provided by the home network to the serving network, e.g. vSMF~hSMF, vPCF~hPCF, vAMF~hAUSF. The above attack may also happen for these services.

This poses a security threat because the subscriber may be deregistered and may not be able to visit the network for a long time, which is a denial of service attack against the user.

According to some embodiments, the home network (or the serving network) shall be able to verify whether the PLMN ID in the N32 message from the serving network (or the home network) is correct. In this case, the security policy 80 indicates which portion of the N32 message (i.e., the registration message) includes the PLMN ID, for verification that the PLMN ID is correct.

Some embodiments thereby address spoofed messages, i.e. messages that claim to come from a certain network but instead are sent from another network. Some embodiments do so by matching of MNC and MCC and SEPP FQDN: If MCC and MNC or PLMN-ID is contained in an incoming message on N32, the receiving SEPP shall verify that the originating SEPP's FQDN matches the one expected for the contained PLMN-ID. Other embodiments mitigate fraudulent registration attack between SEPPs, e.g., based on a kind of authentication method between SEPPs. See 3GPP S3-181474. Some embodiments use policies that tell the SEPP which messages contain a PLMN id (or other information element (IE) of interest), and where in the message to find the PLMN id (or other IE to be used). Based on this, SEPP will know how to perform anti-spoofing and different types of filtering on other IEs without need of being updated for each new type of message.

Generally, though, some embodiments use inter-domain security measures to verify received data against a security policy stating allowed data types and/or data ranges. Anti-spoofing measures are just one example of this.

Figure 6A:
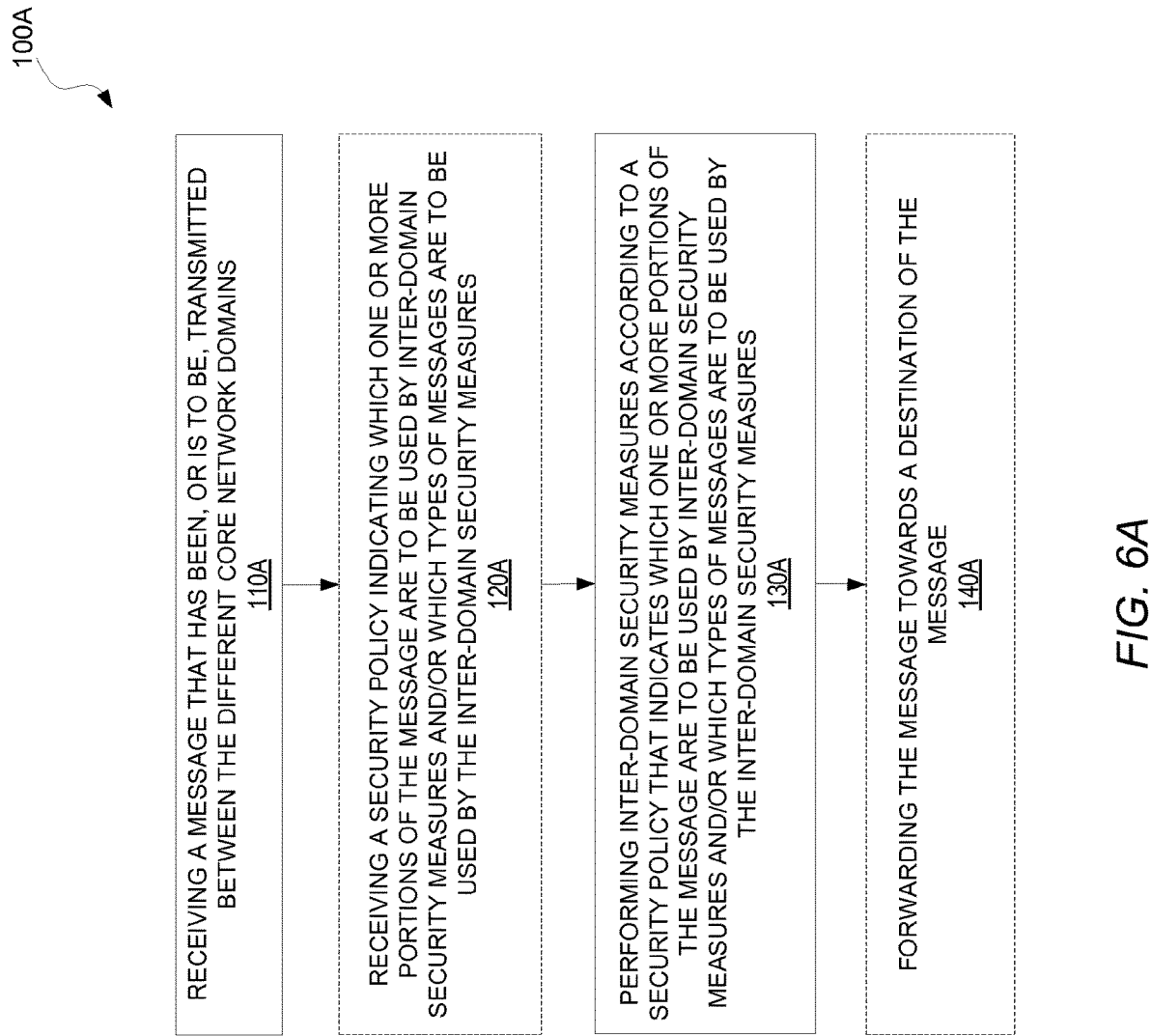
FIG. 6A is a logic flow diagram of a method performed by network equipment according to some embodiments.

In view of the above variations and modifications, network equipment in some embodiments generally performs the method 100A shown in FIG. 6A. The network equipment may be configured as a proxy for one of multiple different core network domains of a wireless communication system 10. For example, the method 100A may be performed by network equipment configured as proxy 40 or proxy 50. The method 100A as shown includes receiving a message 60 that has been, or is to be, transmitted between the different core network domains (Block 110A). The method 100A also includes performing inter-domain security measures according to a security policy 80 that indicates which one or more portions of the message 60 are to be used by the inter-domain security measures and/or which types of messages are to be used by the inter-domain security measures (Block 130A). The inter-domain security measures may for instance include inter-domain anti-spoofing measures for securing the core network domain for which the proxy is configured against spoofing of the message 60. Regardless, the method 100B in some embodiments may include receiving this security policy 80 (Block 120A). The method 100B in some embodiments may also include forwarding the message 60 towards a destination of the message 60 (Block 140A).

In some embodiments, for example, the security policy 80 indicates which portion of the message is a public land mobile network identity or a fully qualified domain name to be used by the inter-domain security measures. Alternatively or additionally, the security policy 80 may indicate which portion of the message is a subscriber permanent identifier, SUPI, to be used by the inter-domain security measures. In these and other embodiments, the one or more portions that are to be used by the inter-domain security measures according to the security policy 80 may include one or more of: a public land mobile network identity, a fully qualified domain name, or a subscriber permanent identifier, SUPI.

In some embodiments, the security policy 80 more specifically indicates which one or more portions of the content of a field in the message are to be used by the inter-domain security measures.

Figure 6B:
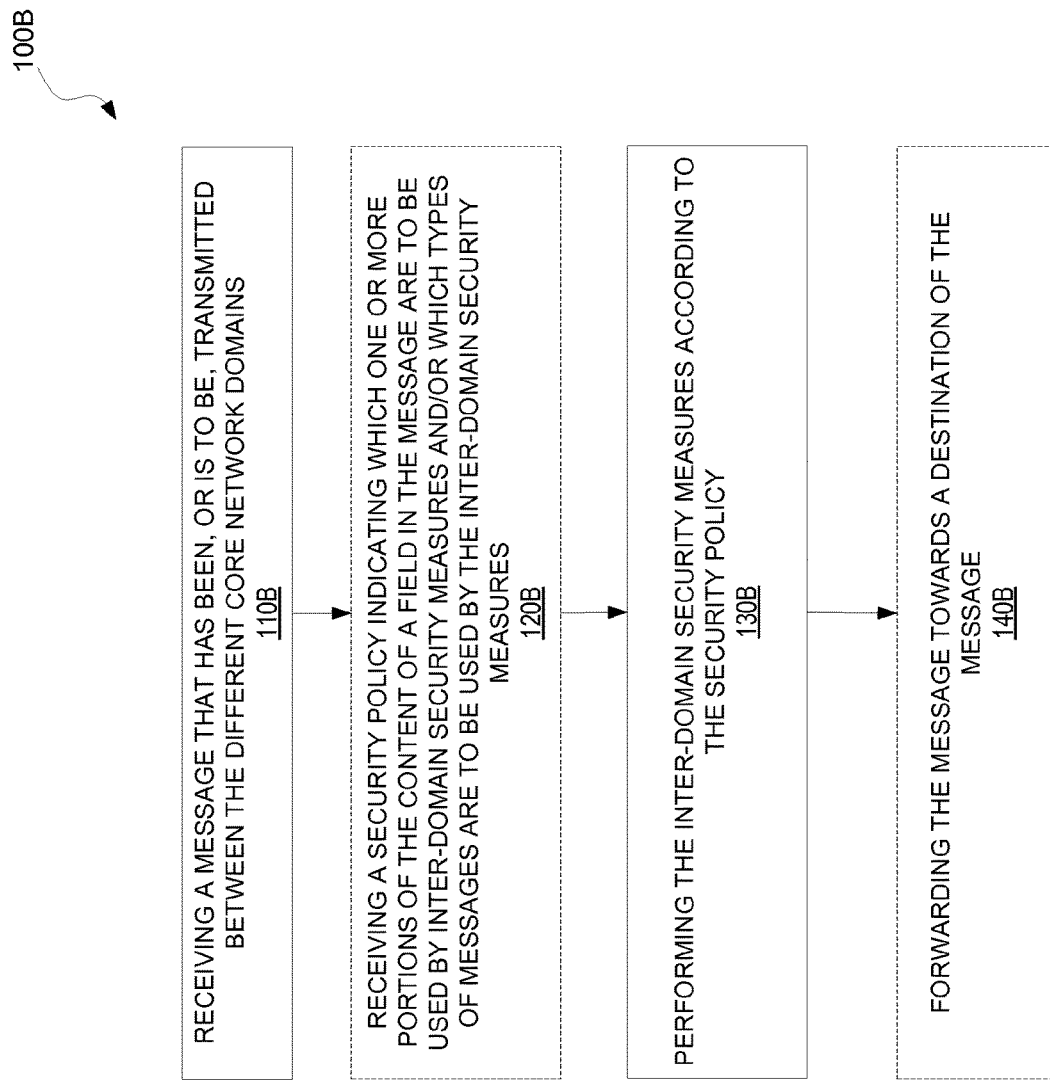
FIG. 6B is a logic flow diagram of a method performed by network equipment according to other embodiments.

Accordingly, network equipment in other embodiments generally performs the method 100B shown in FIG. 6B. The network equipment may be configured as a proxy for one of multiple different core network domains of a wireless communication system 10. For example, the method 100B may be performed by network equipment configured as proxy 40 or proxy 50. The method 100B as shown includes receiving a message 60 that has been, or is to be, transmitted between the different core network domains (Block 110B). The method 100 may also include receiving a security policy 80 indicating which one or more portions of the content of a field in the message 60 are to be used by inter-domain security measures and/or which types of messages are to be used by the inter-domain security measures (Block 120B). The inter-domain security measures may for instance include inter-domain anti-spoofing measures for securing the core network domain for which the proxy is configured against spoofing of the message 60. Regardless, the method 100B may further include performing the inter-domain security measures according to the security policy 80 (Block 130B). The method 100B in some embodiments may also include forwarding the message 60 towards a destination of the message 60 (Block 140B).

In some embodiments, the method further comprises, responsive to receiving the message 60, transmitting a discovery request to a network repository function, NRF, requesting discovery of the security policy 80 for the message 60, and receiving the security policy in response to the discovery request. Alternatively, the method may comprise receiving the security policy 80 from network equipment in a path that the message takes from a source of the message to the destination of the message.

In some embodiments, the security policy 80 indicates which one or more portions of the content of a field in the message 60 includes a public land mobile network identity, a mobile network code, a mobile country code, or a fully qualified domain name to be used by the inter-domain security measures. Alternatively or additionally, the security policy 80 in some embodiments indicates which one or more portions of the content of a field in the message includes a subscriber permanent identifier, SUPI, to be used by the inter-domain security measures.

In some embodiments, the network equipment is configured as a first proxy for a first core network domain, and the message is received from a second proxy that is a proxy for a second core network domain. In one such embodiment, performing the inter-domain security measures using the one or more indicated portions may comprise verifying whether a core network domain identified from the one or more indicated portions is the second core network domain for which the second proxy is a proxy.

Alternatively or additionally, in some embodiments where the message 60 has been transmitted between the different core network domains, performing the inter-domain security measures using the one or more indicated portions may comprise determining an expected identifier that is expected for the one or more indicated portions, and verifying whether an identifier associated with a proxy from which the message 60 was received matches the expected identifier.

In some embodiments, the security policy 80 indicates which one or more portions of the content of a field in the message 60 is a mobile network code, MNC, and mobile country code, MCC, to be used by the inter-domain security measures. In one such embodiment where the message has been transmitted between the different core network domains, performing the inter-domain security measures using the one or more indicated portions may comprise verifying that the combination of MCC and MNC is valid.

Alternatively or additionally, in some embodiments where the security policy 80 indicates which one or more portions of the content of a field in the message 60 is a subscriber permanent identifier, SUPI, to be used by the inter-domain security measures, and where the message 60 has been transmitted between the different core network domains, performing the inter-domain security measures using the one or more indicated portions may comprise verifying whether the SUPI is within a range of SUPIs allocated to one or more certain core network domains.

In some embodiments, performing the inter-domain security measures using the one or more indicated portions may alternatively or additionally comprise verifying a secret or signature based on the one or more indicated portions.

In some embodiments, the message is a registration message for registering a serving network function with a home network function.

In some embodiments, the security policy 80 includes one or more regular expressions that indicate the one or more portions. Alternatively or additionally, the security policy 80 may include one or more JavaScript Object Notation, JSON, Pointers, that indicate the one or more portions. Alternatively or additionally, the security policy 80 may include one or more ranges of bytes within the field, and/or one or more ranges of bits within the field, that indicate the one or more portions. Alternatively or additionally, the security policy 80 may include one or more search patterns, one or more tokens, and/or one or more substrings, that indicate the one or more.

In some embodiments, the method further comprises extracting the one or more portions of the content of the field for using in the inter-domain security measures, by parsing the content using the security policy 18.

In some embodiments where the message is a Hypertext Transfer Protocol (HTTP) message, the field is an HTTP field.

In some embodiments, the method further comprises transmitting a discovery request to a discovery service requesting discovery of the security policy 80 for the message 60, and receiving the security policy 80 in response to the discovery request. For example, in one or more embodiments, the method comprises transmitting the discovery request responsive to receiving the message. Regardless, in some embodiments, the discovery service is implemented by a network repository function, NRF.

In other embodiments, the method may comprise receiving the security policy 80 from network equipment in a path that the message 60 takes from a source of the message 60 to the destination of the message 60. In these and other embodiments, the method may comprise receiving the security policy from either a source of the message or the destination of the message. Alternatively or additionally, the method may comprise receiving the security policy from other network equipment from which the message is received, wherein the other network equipment is also configured as a proxy between the different core network domains. In these and other embodiments, the security policy 80 may be included in the message 60.

In some embodiments, the message 60 is an application layer message. In one or more of these embodiments, the field is an application layer field, and the content of the field comprises application layer information.

In some embodiments, the network equipment is configured as a Security Edge Protection Proxy, SEPP.

In some embodiments, the core network domains comprise core networks of different public land mobile networks, PLMNs.

Also in view of the above variations and modifications, network equipment in other embodiments generally performs the method 200B shown in FIG. 6A for facilitating security of a message 60 transmitted between different core network domains of a wireless communication system 10. The method 200A may be performed for example by network equipment implementing NF 20, proxy 40, proxy 50, NF 30, or NRF(s) 90. The method 200A as shown in this regard includes obtaining a security policy 80 that indicates which one or more portions of the message 60 are to be used by inter-domain security measures and/or which types of messages are to be used by the inter-domain security measures (Block 210A). The method 200B may also include transmitting the security policy 80 (Block 220A).

In some embodiments, for example, the security policy 80 indicates which portion of the message is a public land mobile network identity or a fully qualified domain name to be used by the inter-domain security measures. Alternatively or additionally, the security policy 80 may indicate which portion of the message is a subscriber permanent identifier, SUPI, to be used by the inter-domain security measures. In these and other embodiments, the one or more portions that are to be used by the inter-domain security measures according to the security policy 80 may include one or more of: a public land mobile network identity, a fully qualified domain name, or a subscriber permanent identifier, SUPI.

In some embodiments, the security policy 80 more specifically indicates which one or more portions of the content of a field in the message are to be used by the inter-domain security measures.

Accordingly, network equipment in other embodiments generally performs the method 200B shown in FIG. 6B for facilitating security of a message 60 transmitted between different core network domains of a wireless communication system 10. The method 200B may be performed for example by network equipment implementing NF 20, proxy 40, proxy 50, NF 30, or NRF(s) 90. The method 200B as shown in this regard includes obtaining a security policy that indicates which one or more portions of (e.g., the content of a field in) the message are to be used by inter-domain security measures and/or which types of messages are to be used by the inter-domain security measures (Block 210B). The method 200B may also include transmitting the security policy 80 (Block 220B).

For example, in some embodiments, transmitting the security policy comprises transmitting the security policy to network equipment configured, as a proxy one of the different core network domains, to perform inter-domain security measures according to the security policy.

Alternatively or additionally, the method may be performed by network equipment that implements a network repository function, NRF, and may further comprise receiving a discovery request requesting discovery of the security policy for the message, and transmitting the security policy in response to the discovery request.

Alternatively, the method may be performed by network equipment in a path that the message takes from a source of the message to the destination of the message (e.g., by NF 20, proxy 40, proxy 50, or NF 30).

In some embodiments, the security policy 80 indicates which one or more portions of the content of a field in the message 60 includes a public land mobile network identity, a mobile network code, a mobile country code, or a fully qualified domain name to be used by the inter-domain security measures. Alternatively or additionally, the security policy 80 in some embodiments indicates which one or more portions of the content of a field in the message includes a subscriber permanent identifier, SUPI, to be used by the inter-domain security measures.

In some embodiments, the inter-domain security measures comprise verifying whether a core network domain identified from the one or more indicated portions is a core network domain from which the message is received.

Alternatively or additionally, in some embodiments the inter-domain security measures comprise verifying whether an identifier associated with a proxy from which the message 60 was received matches an expected identifier that is expected for the one or more indicated portions.

In some embodiments, the security policy 80 indicates which one or more portions of the content of a field in the message 60 is a mobile network code, MNC, and mobile country code, MCC, to be used by the inter-domain security measures. In one such embodiment, the inter-domain security measures comprise verifying that the combination of MCC and MNC is valid.

Alternatively or additionally, in some embodiments where the security policy 80 indicates which one or more portions of the content of a field in the message 60 is a subscriber permanent identifier, SUPI, to be used by the inter-domain security measures, the inter-domain security measures may comprise verifying whether the SUPI is within a range of SUPIs allocated to one or more certain core network domains.

In some embodiments, the inter-domain security measures may alternatively or additionally comprise verifying a secret or signature based on the one or more indicated portions.

In some embodiments, the message is a registration message for registering a serving network function with a home network function.

In some embodiments, the security policy 80 includes one or more regular expressions that indicate the one or more portions. Alternatively or additionally, the security policy 80 may include one or more JavaScript Object Notation, JSON, Pointers, that indicate the one or more portions. Alternatively or additionally, the security policy 80 may include one or more ranges of bytes within the field, and/or one or more ranges of bits within the field, that indicate the one or more portions. Alternatively or additionally, the security policy 80 may include one or more search patterns, one or more tokens, and/or one or more substrings, that indicate the one or more.

In some embodiments where the message is a Hypertext Transfer Protocol (HTTP) message, the field is an HTTP field.

In some embodiments, transmitting the security policy 80 comprises transmitting the security policy 80 to network equipment configured, as a proxy one of the different core network domains, to perform the inter-domain security measures according to the security policy 80.

In some embodiments, the method is performed by network equipment that implements a network repository function, NRF.

In other embodiments, the method is performed by network equipment in a path that the message takes from a source of the message to the destination of the message. In these and other embodiments, the method may be performed by network equipment that is a source of the message or a destination of the message.

In some embodiments, the method is performed by network equipment configured as a proxy between the different core network domains.

In some embodiments, transmitting the security policy comprises transmitting the message with the security policy included in the message.

In some embodiments, the message 60 is an application layer message. In one or more of these embodiments, the field is an application layer field, and the content of the field comprises application layer information.

In some embodiments, the core network domains comprise core networks of different public land mobile networks, PLMNs.

Although embodiments have been exemplified in a context for transmitting a message 60 between core network domains that take the form of core networks in different PLMNs, embodiments herein are extendable to any type of core network domains. In fact, in some embodiments, the core network domains are different domains within the same core network.

Note further that embodiments herein may use any of one or more communication protocols known in the art or that may be developed, such as IEEE 802.xx, Code Division Multiple Access (CDMA), Wideband CDMA (WCDMA), Global System for Mobile telecommunications (GSM), Long Term Evolution (LTE), WiMax, New Radio (NR), or the like. Accordingly, although sometimes described herein in the context of 5G, the principles and concepts discussed herein are applicable to 4G systems and others.

A wireless device 12 as used herein is any type device capable of communicating with another radio node wirelessly over radio signals. A wireless device 12 may therefore refer to a user equipment (UE), a mobile station, a laptop, a smartphone, a machine-to-machine (M2M) device, a machine-type communications (MTC) device, a narrowband Internet of Things (loT) device, etc. That said, although the wireless device 12 may be referred to as a UE, it should be noted that the wireless device does not necessarily have a "user" in the sense of an individual person owning and/or operating the device. A wireless device 12 may also be referred to as a wireless communication device, a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be generally configured to transmit and/or receive data without direct human interaction.

In an IOT scenario, a wireless device 12 as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

As used herein, "network equipment" refers to equipment capable, configured, arranged and/or operable to communicate directly or indirectly with a wireless device and/or with other equipment in the wireless communication network that enable and/or provide wireless access to the wireless device 12. Examples of network equipment include, but are not limited to, core network equipment in a core network (e.g., equipment that implements an AMF or SMF).

Note that the network equipment as described above may perform any of the processing herein by implementing any functional means or units. In one embodiment, for example, the network equipment comprises respective circuits or circuitry configured to perform the steps shown in FIG. 6A and/or FIG. 6B. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 8A:
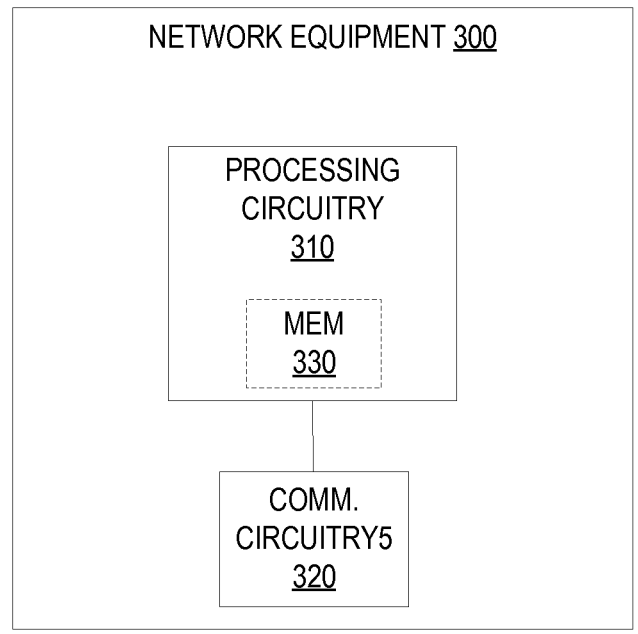
FIG. 8A is a block diagram of network equipment according to some embodiments.

FIG. 8A illustrates network equipment 300 in accordance with one or more embodiments. As shown, the network equipment 300 includes processing circuitry 310 and communication circuitry 320. The communication circuitry 320 is configured to transmit and/or receive information to and/or from one or more other nodes, e.g., via any communication technology. The processing circuitry 310 is configured to perform processing described above, e.g., in FIG. 6A and/or FIG. 6B, such as by executing instructions stored in memory 330. The processing circuitry 310 in this regard may implement certain functional means, units, or modules.

Figure 8B:
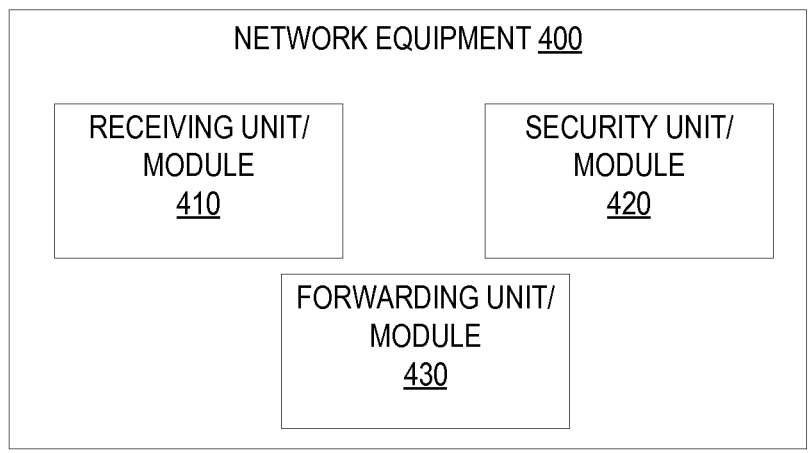
FIG. 8B is a block diagram of network equipment according to other embodiments.

FIG. 8B illustrates network equipment 400 in accordance with one or more other embodiments. As shown, the network equipment 400 implements various functional means, units, or modules, e.g., via the processing circuitry 410 in FIG. 8A and/or via software code. These functional means, units, or modules, e.g., for implementing the method in FIG. 6B, include for instance a receiving unit or module 410 for receiving a message 60 that has been, or is to be, transmitted between the different core network domains, and for receiving a security policy 80 indicating which one or more portions of (e.g., the content of a field in) the message 60 are to be used by inter-domain security measures and/or which types of messages are to be used by the inter-domain security measures. Also included may be a security unit or module 420 for performing the inter-domain security measures according to the security policy. Further included in some embodiments may be a forwarding unit or module 430 for forwarding the message 60 towards a destination of the message 60.

Figure 7B:
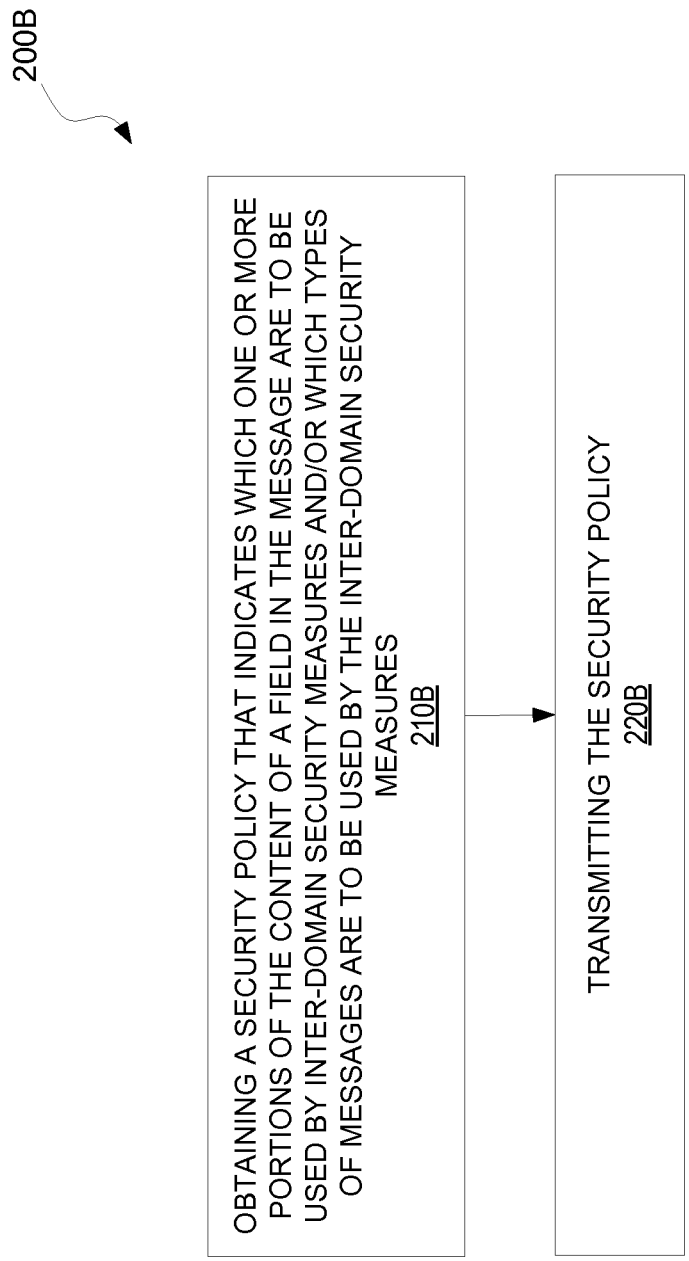
FIG. 7B is a logic flow diagram of a method performed by network equipment according to other embodiments.

Also note that the other network equipment as described above may perform any of the processing herein by implementing any functional means or units. In one embodiment, for example, network equipment comprises respective circuits or circuitry configured to perform the steps shown in FIG. 7A and/or FIG. 7B. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 9A:
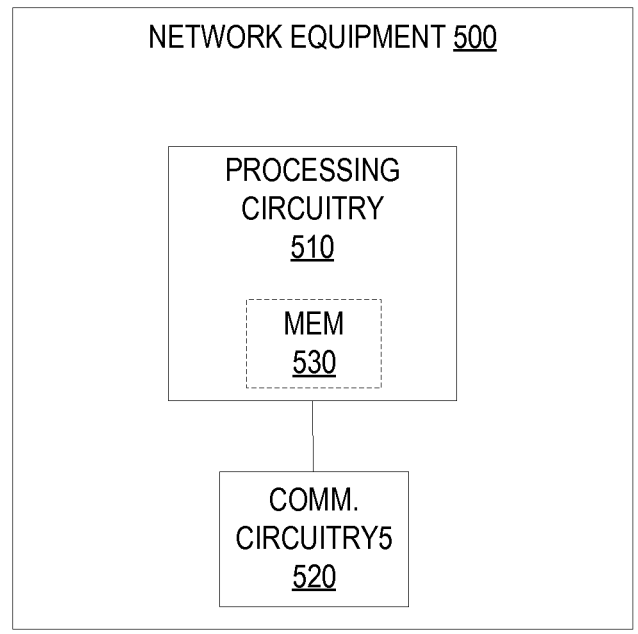
FIG. 9A is a block diagram of network equipment according to still other embodiments.

FIG. 9A illustrates network equipment 500 in accordance with one or more embodiments. As shown, the network equipment 500 includes processing circuitry 510 and communication circuitry 520. The communication circuitry 520 is configured to transmit and/or receive information to and/or from one or more other nodes, e.g., via any communication technology. The processing circuitry 510 is configured to perform processing described above, e.g., in FIG. 7A and/or FIG. 7B, such as by executing instructions stored in memory 530. The processing circuitry 510 in this regard may implement certain functional means, units, or modules.

Figure 9B:
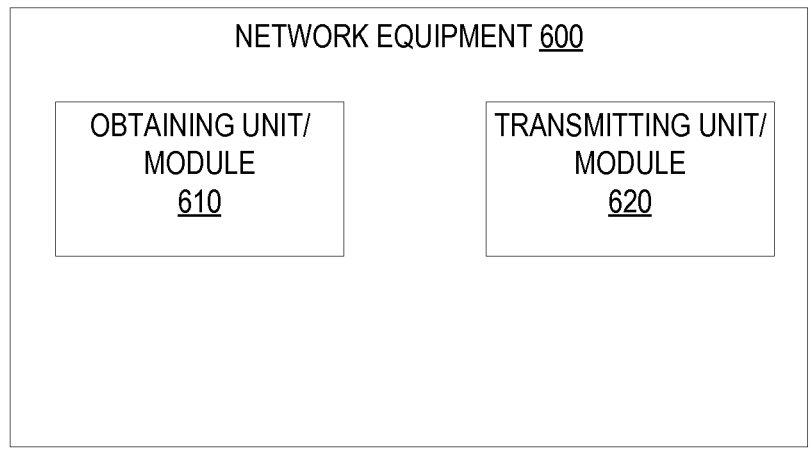
FIG. 9B is a block diagram of network equipment according to yet other embodiments.

FIG. 9B illustrates network equipment 600 in accordance with one or more other embodiments. As shown, the network equipment 600 implements various functional means, units, or modules, e.g., via the processing circuitry 610 in FIG. 9A and/or via software code. These functional means, units, or modules, e.g., for implementing the method in FIG. 7B, include for instance an obtaining unit or module 410 for obtaining a security policy that indicates which one or more portions of (e.g., the content of a field in) the message are to be used by inter-domain security measures and/or which types of messages are to be used by the inter-domain security measures. Further included may be a transmitting unit or module 420 for transmitting the security policy 80.

Those skilled in the art will also appreciate that embodiments herein further include corresponding computer programs.

A computer program comprises instructions which, when executed on at least one processor of network equipment, cause the network equipment to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a non-transitory computer readable (storage or recording) medium that has stored thereon instructions that, when executed by a processor of a network equipment, cause the network equipment to perform as described above.

The invention claimed is:

1. A method performed by network equipment configured as a first proxy for a first core network domain of multiple different core network domains of a wireless communication system, the method comprising:

receiving a message that has been, or is to be, transmitted between the different core network domains, wherein said receiving comprises receiving the message from a second proxy that is a proxy for a second core network domain;

obtaining a security policy that indicates which one or more portions of the content of a field in the message are to be used by inter-domain security measures by indicating how to parse the content of the field in order to identify the one or more portions that are to be used by the inter-domain security measures, wherein the security policy includes one or more regular expressions, or one or more search patterns, with which the network equipment is to parse the content of the field in order to identify the one or more portions that are to be used by the inter-domain security measures, wherein the security policy indicates which portion of the content of a field in the message is a public land mobile network identity or a fully qualified domain name to be used by the inter-domain security measures by indicating how to parse the content of the field in order to identify the public land mobile network identity or a fully qualified domain name that is to be used by the inter-domain security measures;

extracting the one or more portions of the content of the field by parsing the content of the field using the one or more regular expressions or the one or more search patterns included in the security policy; and performing the inter-domain security measures using the one or more portions extracted, wherein the inter-domain security measures include inter-domain anti-spoofing measures for securing the first core network domain for which the first proxy is configured against spoofing of the message, wherein performing the inter-domain security measures using the one or more portions extracted comprises verifying whether a core network domain identified from the one or more portions extracted is the second core network domain for which the second proxy is a proxy.

2. The method of claim 1, wherein the security policy indicates which types of messages are to be used by the inter-domain security measures, wherein the method further comprises determining whether the received message is of a type to be used by the inter-domain security measures according to the security policy, and wherein said extracting and performing is performed based on determining that the received message is of a type to be used by the inter-domain security measures according to the security policy.

3. The method of claim 1, wherein the security policy further indicates which portion of the content of a field in the message is a subscriber permanent identifier, SUPI, to be used by the inter-domain security measures by indicating how to parse the content of the field in order to identify the SUPI that is to be used by the inter-domain security measures.

4. The method of claim 1, wherein the message has been transmitted between the different core network domains, and wherein performing the inter-domain security measures using the one or more portions extracted comprises:
    determining an expected identifier that is expected for the one or more portions extracted; and
    verifying whether an identifier associated with a proxy from which the message was received matches the expected identifier.

5. The method of claim 1, wherein obtaining the security policy comprises receiving the security policy from a discovery service implemented by a Network Repository Function (NRF).

6. The method of claim 1, wherein the security policy indicates which portion of the content of a field in the message is a public land mobile network identity to be used by the inter-domain security measures by indicating how to parse the content of the field in order to identify the public land mobile network identity that is to be used by the inter-domain security measures.

7. The method of claim 1, wherein the security policy includes the one or more regular expressions with which the network equipment is to parse the content of the field in order to identify the one or more portions that are to be used by the inter-domain security measures.

8. The method of claim 1, wherein the message is a Hypertext Transfer Protocol (HTTP) message and the field is an HTTP field.

9. The method of claim 1, wherein the message is an application layer message.

10. The method of claim 1, wherein the network equipment is configured as a Security Edge Protection Proxy, SEPP.

11. The method of claim 1, wherein the core network domains comprise core networks of different public land mobile networks, PLMNs.

12. The method of claim 1, wherein said extracting comprises generically applying the one or more regular expressions included in the security policy to the content of the field without regard to a type, structure, or formatting of the content of the field, wherein the one or more regular expressions themselves account for the type, structure, or formatting of the content of the field.

13. The method of claim 1, wherein obtaining the security policy comprises receiving the security policy separate from the message, wherein the security policy is to be applied to any message received by the network equipment or to any message of a certain type received by the network equipment.

14. Network equipment configured as a first proxy for a first core network domain of multiple different core network domains of a wireless communication system, wherein the network equipment comprises communication circuitry and processing circuitry wherein the network equipment is configured to:
    receive a message that has been, or is to be, transmitted between the different core network domains, wherein the message is received from a second proxy that is a proxy for a second core network domain;
    obtain a security policy that indicates which one or more portions of the content of a field in the message are to be used by inter-domain security measures by indicating how to parse the content of the field in order to identify the one or more portions that are to be used by the inter-domain security measures, wherein the security policy includes one or more regular expressions, or one or more search patterns, with which the network equipment is to parse the content of the field in order to identify the one or more portions that are to be used by the inter-domain security measures, wherein the security policy indicates which portion of the content of a field in the message is a public land mobile network identity or a fully qualified domain name to be used by the inter-domain security measures by indicating how to parse the content of the field in order to identify the public land mobile network identity or a fully qualified domain name that is to be used by the inter-domain security measures;
    extract the one or more portions of the content of the field by parsing the content of the field using the one or more regular expressions or the one or more search patterns included in the security policy; and
    perform the inter-domain security measures using the one or more portions extracted, wherein the inter-domain security measures include inter-domain anti-spoofing measures for securing the first core network domain for which the first proxy is configured against spoofing of the message, wherein the inter-domain security measures are performed using the one or more portions extracted by verifying whether a core network domain identified from the one or more portions extracted is the second core network domain for which the second proxy is a proxy.

15. The network equipment of claim 14, wherein the security policy includes one or more regular expressions with which the network equipment is to parse the content of the field in order to identify the one or more portions that are to be used by the inter-domain security measures.

16. The network equipment of claim 14, wherein the network equipment comprises communication circuitry and processing circuitry wherein the network equipment is configured to parse the content of the field by generically applying the one or more regular expressions included in the security policy to the content of the field without regard to a type, structure, or formatting of the content of the field, wherein the one or more regular expressions themselves account for the type, structure, or formatting of the content of the field.

17. The network equipment of claim 14, wherein the network equipment comprises communication circuitry and processing circuitry wherein the network equipment is configured to obtain the security policy by receiving the security policy separate from the message, wherein the security policy is to be applied to any message received by the network equipment or to any message of a certain type received by the network equipment.

* * * * *